United States Patent [19]

Frazee, Jr. et al.

[11] Patent Number: 4,594,763

[45] Date of Patent: Jun. 17, 1986

[54] METHOD AND APPARATUS FOR INSERTING A GLASS ROD INTO A GLASS TUBE

[75] Inventors: Ralph E. Frazee, Jr., Brick Township, Ocean County; John R. Nis, Hamilton Township, Mercer County, both of N.J.; Joseph Sanchez, Santa Rosa, Calif.; Carroll D. Spainhour, Princeton Township, Mercer County; Robert P. Stawicki, Brick Township, Ocean County, both of N.J.

[73] Assignee: AT&T Technologies, Inc., Berkeley Heights, N.J.

[21] Appl. No.: 685,147

[22] Filed: Dec. 21, 1984

[51] Int. Cl.<sup>4</sup> ............ B23Q 17/00; B23P 21/00; C03B 23/207
[52] U.S. Cl. ............................ 29/407; 29/702; 29/707; 65/29
[58] Field of Search ............ 350/96.3, 96.31; 65/3.2, 29; 29/407, 700, 702, 705, 707, 720, 721

[56] References Cited

U.S. PATENT DOCUMENTS

| | | | |
|---|---|---|---|
| 3,877,912 | 4/1975 | Shiraishi et al. | 65/3 |
| 4,123,483 | 10/1978 | Nakahara et al. | 65/3.2 |
| 4,321,072 | 3/1982 | Dubos et al. | 65/29 |
| 4,389,229 | 6/1983 | Jang et al. | 65/29 |
| 4,412,853 | 11/1983 | Partus | 65/29 |
| 4,523,938 | 6/1985 | Grego | 65/29 |

Primary Examiner—Howard N. Goldberg
Assistant Examiner—Steven Nichols
Attorney, Agent, or Firm—R. B. Levy

[57] ABSTRACT

Insertion of a lightguide preform (12) into a tube (14) without contacting the sides thereof is accomplished by first roughly aligning the rod in spaced axial alignment with the tube. Thereafter, the offset of the rod from the axis of the tube is measured and the amount of lateral movement of the rod from the axis is determined. Then the rod is moved laterally in accordance with the determined amount of movement to precisely align the rod with the tube. Once alignment has been achieved, the rod is inserted in the tube and the tube is collapsed thereabout. An apparatus (10) for practicing this method is disclosed.

16 Claims, 8 Drawing Figures

METHOD AND APPARATUS FOR INSERTING A GLASS ROD INTO A GLASS TUBE

TECHNICAL FIELD

This invention relates to a method for inserting a glass rod into a glass tube.

BACKGROUND OF THE INVENTION

Lightguide fiber of the type used to carry optical signals is typically fabricated by heating and drawing a portion of a lightguide preform comprised of a refractive core surrounded by a protective glass cladding. Presently, there are several known processes for fabricating preforms. However, the modified chemical vapor deposition (MCVD) process, which is described in U.S. Pat. No. 4,217,027 issued to J. B. MacChesney et al. on Aug. 12, 1980 and assigned to Bell Laboratories, Inc., has been found most useful because the process enables large scale production of preforms which yield very low loss lightguide fiber.

During the fabrication of preforms by the MCVD process, precursor, reactant-containing gases, such as $SiCl_4$ and $GeCl_4$ are passed through a rotating starter tube of silica glass. A torch heats the tube from the outside as the precursor gases pass therethrough, causing deposition of submicron-sized doped glass particles on the inside surface of the tube. The torch is repeatedly moved along the axis of the tube to build up layer upon layer of doped glass. Once a sufficient number of layers has been deposited, the starter tube is then heated to achieve collapse thereof to yield the resultant preform.

Increased demand for lightguide fiber has prompted efforts to increase the productivity of the MCVD process. However, the MCVD process rate is limited by the thickness of the walls of the starter tube. To obtain lightguide fiber having optimal optical and mechanical characteristics, the preform must have a core-to-cladding mass ratio within certain specified limits. Increasing the diameter of the starter tube to obtain a larger preform requires that the walls of the starter tube be made thicker to obtain the desired core-to-cladding mass ratio. However, increasing the thickness of the walls of the tube reduces the rate of heat transfer to the reactant-containing gases, thereby increasing the time required to deposit each layer of doped glass particles. If the walls of the tube are too thick, then insufficient heat transfer may occur, causing the tube to distort and the outside thereof to ablate.

One way in which the productivity of the MCVD process can be increased is to first produce an undercladded preform, having a larger than desired core-to-cladding mass ratio and then inserting the preform into an overcladding glass tube which is then collapsed thereabout. This method is referred to as the rod and tube technique.

In the past, insertion of the preform into the overcladding tube has been accomplished manually which incurs certain disadvantages. If the preform contacts the inside surface of the tube during insertion, then the strength of the resultant drawn fiber will be degraded. Further, radial misalignment between the tube and the undercladded preform may occur during manual insertion, causing the resultant drawn fiber to have an eccentric core which will prevent proper splicing of the fiber to another.

U.S. Pat. No. 3,877,912 issued to Shiraishi et al. on Apr. 15, 1975, discloses a method for producing an optical transmission line whose steps are but a variation of the rod and tube technique discussed above. According to the Shiraishi et al. method, a layer of doped glass particles is deposited on the inside surface of a starter cylinder. Instead of collapsing the starter cylinder to obtain an undercladded preform, a glass rod is inserted into the starter cylinder. The starter cylinder, with the rod coaxially inserted therein, is then collapsed. Insertion of the rod into the starter cylinder is fraught with the same problems associated with the insertion of the undercladded preform into the overcladding tube.

Accordingly, there is a need for a technique for accurately inserting a rod, such as a lightguide preform, into a glass tube.

SUMMARY OF THE INVENTION

The foregoing disadvantages are overcome by the present method of inserting a glass rod into a tube comprising the steps of: roughly aligning the rod axially with the tube; measuring the offset of the rod from the axis of the tube to determine the amount of lateral movement required to precisely align the rod with the tube; laterally moving the rod in accordance with the determined amount of movement; inserting the rod into the tube; and capturing the rod within the tube.

By employing the above-described method to insert an undercladded preform into an overcladding tube, contacting the inside walls of the tube is avoided. Further, the amount of eccentricity in the core of the resultant fiber drawn from the preform produced by this method is reduced.

DETAILED DESCRIPTION

Figure 1:
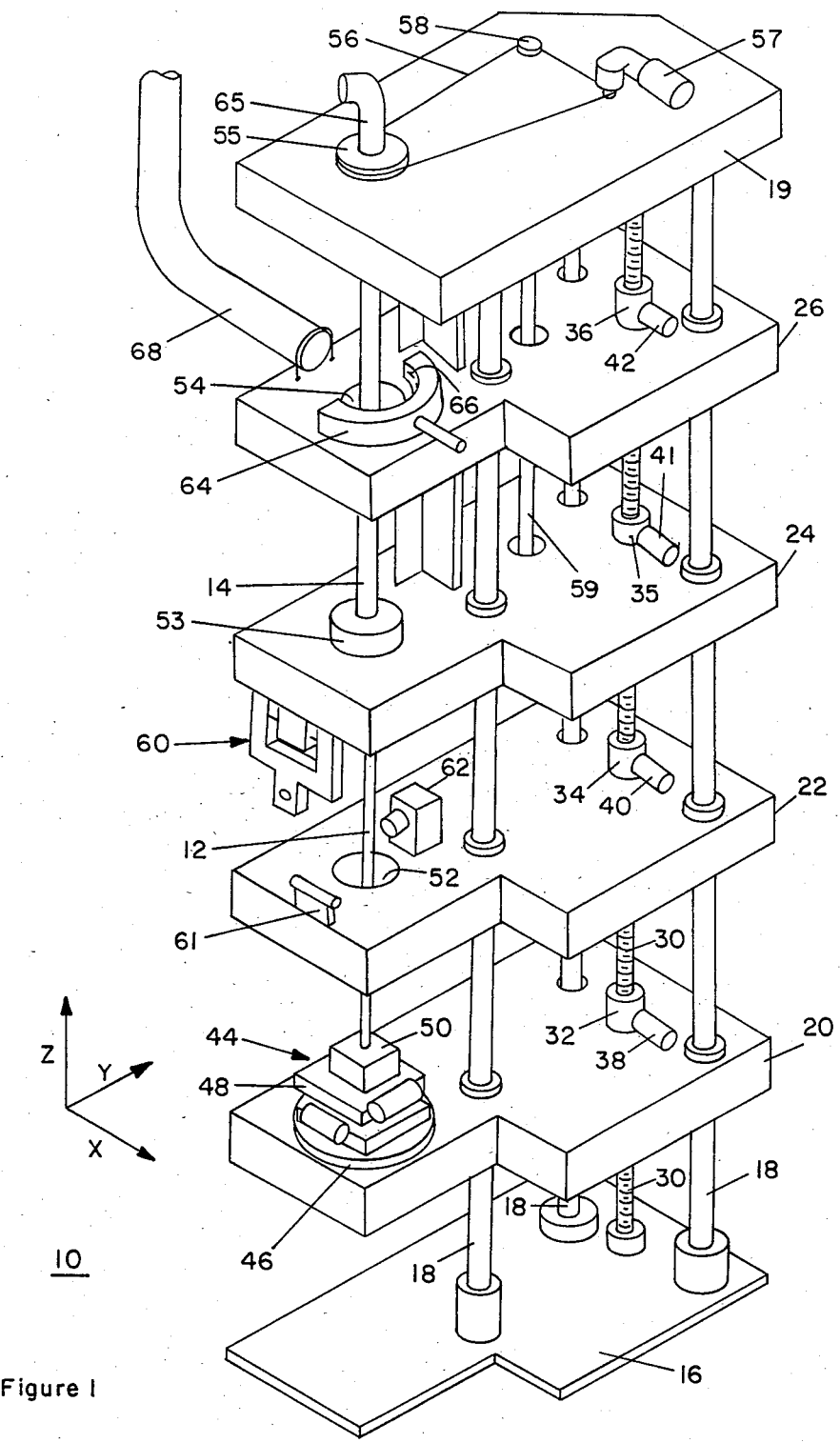
FIG. 1 is a perspective schematic view of an apparatus in accordance with the present invention for inserting a glass rod into a tube.

FIG. 1 is a perspective view of an apparatus 10 for inserting a glass rod 12, such as an undercladded lightguide preform, that is, one having a larger than desired core-to-cladding mass ratio, into a glass tube 14. The apparatus 10 includes a base 16 which mounts one end of each of a plurality of parallel, spaced-apart, upwardly extending poles 18—18. Each of the poles 18—18 has its upper end attached to a platform 19 which is in parallel, spaced-apart relationship above the base 16. Slidably mounted to the poles 18—18 intermediate the platform 19 and the base 16 are four parallel, spaced-apart platforms 20, 22, 24 and 26 in vertical registration one above the other.

A lead screw 30 has each of its ends mounted to the base 16 and to the platform 19, respectively, so as to pass through an opening (not shown) in each of platforms 20, 22, 24 and 26. A plurality of lead nuts 32, 34, 35 and 36 each threadadly engage the lead screw 30 above a separate one of platforms 20, 22, 24 and 26. The lead nuts 32, 34, 35 and 36 are each rotatably driven by a separate one of a plurality of motors 38, 40, 41 and 42, each typically a Bodine model 908 DC gear motor manufactured by Bodine Corp., Chicago, Ill. Each of motors 38, 40, 41 and 42 is mounted on a separate one of the platforms 20, 22, 24 and 26, respectively.

To engage the lower end of the preform 12, the platform 20 carries a gimbal 44 which includes a servo-controlled rotary table 46 which is mounted on the upper surface of the platform. The rotary table 46, whose construction is well known in the art, has a servo-driven X-Y stage 48, such as those manufactured by Aero Tech Corporation, Pittsburgh, Pa., mounted thereon. The stage 48 supports a seat 50 (described in greater detail with respect to FIG. 2) which holds one end of the preform 12.

The preform 12 extends upwardly from the seat 50 through an opening 52 in the platform 22 in coaxial alignment with a chuck 53 rotatably journaled in the platform 24. The chuck 53 serves to engage one end of the tube 14. The tube 14 extends upwardly from the chuck 53 through an opening 54 in the platform 26 for engagement by a chuck 55 rotatably journaled in the platform 19. The chuck 55 has a set of sprocket teeth (not shown) circumscribing its outer periphery, near the top thereof, for engaging a chain 56 driven by a motor 57. The chain 56 also engages an idler sprocket 58 which is connected to a shaft 59 that extends vertically downwardly through the platforms 26 and 24 to drive the chuck 53 in a manner described hereinafter with respect to FIG. 3.

A nest 60 (described in greater detail with respect to FIG. 3) is pivotally mounted to the undersurface of the platform 24. The nest 60 is pivotable between a vertical position (shown in FIG. 1) and a horizontal position (not shown) at which the nest is parallel to, and directly beneath, the platform 24.

The portion of the preform 12 which extends above the opening 52 in platform 22 is illuminated by a light source 61. Typically, the light source 61 comprises a horizontally positioned, small wattage fluorescent lamp mounted on the platform 22 on one side of the opening 52. A line scan camera 62, such as manufactured by Reticon Corp., Sunnyvale, Calif., is mounted on the platform 22 on the opposite side of the opening 52 from the light source 61 so as to be in registration with the light passing through and around the preform 12. The operation of the camera 62 will be further described hereinafter with respect to FIGS. 6 and 7.

A torch 64 is mounted on the platform 26 so as to partially circumscribe the opening 54 through which the tube 14 extends. In practice, the torch 64 is identical to that described in U.S. Pat. No. 4,477,244, issued to J. R. Nis and C. D. Spainhour and assigned to the assignee of the present invention, which is incorporated by reference herein. The torch 64 is operated in the manner described in that patent to heat the tube 14 to accomplish firepolishing and collapse thereof as the platform 26 is reciprocated between the platforms 19 and 24. During firepolishing of the tube 14, oxygen from a suitable source (not shown) is admitted into the tube through a rotary coupling 65 journaled in the upper end of the chuck 55. The oxygen serves to drive out any contaminants that may be present inside the tube 14 during firepolishing.

The normal operation of the torch 64, while suitable for firepolishing, collapsing and necking down the upper end of the tube 14, is not useful for staking lower ends of the tube to capture the preform 12 therein. This is because the torch 64, when operated in the manner described in the aforementioned patent, produces a wide heat zone. To stake the lower end of the tube 14, a very narrow heat zone is required. In practice, the heat zone of the torch 64 can be reduced by blocking one or more of jets 66 of the torch through which combustible gases, such as hydrogen and oxygen, are expelled prior to ignition so that a very narrow, focused flame is produced. An exhaust tube 68 is mounted to the platform 22 on the side of the opening 54 opposite the torch 64 to draw any excess hydrogen gas before the torch is lit.

Figure 2:
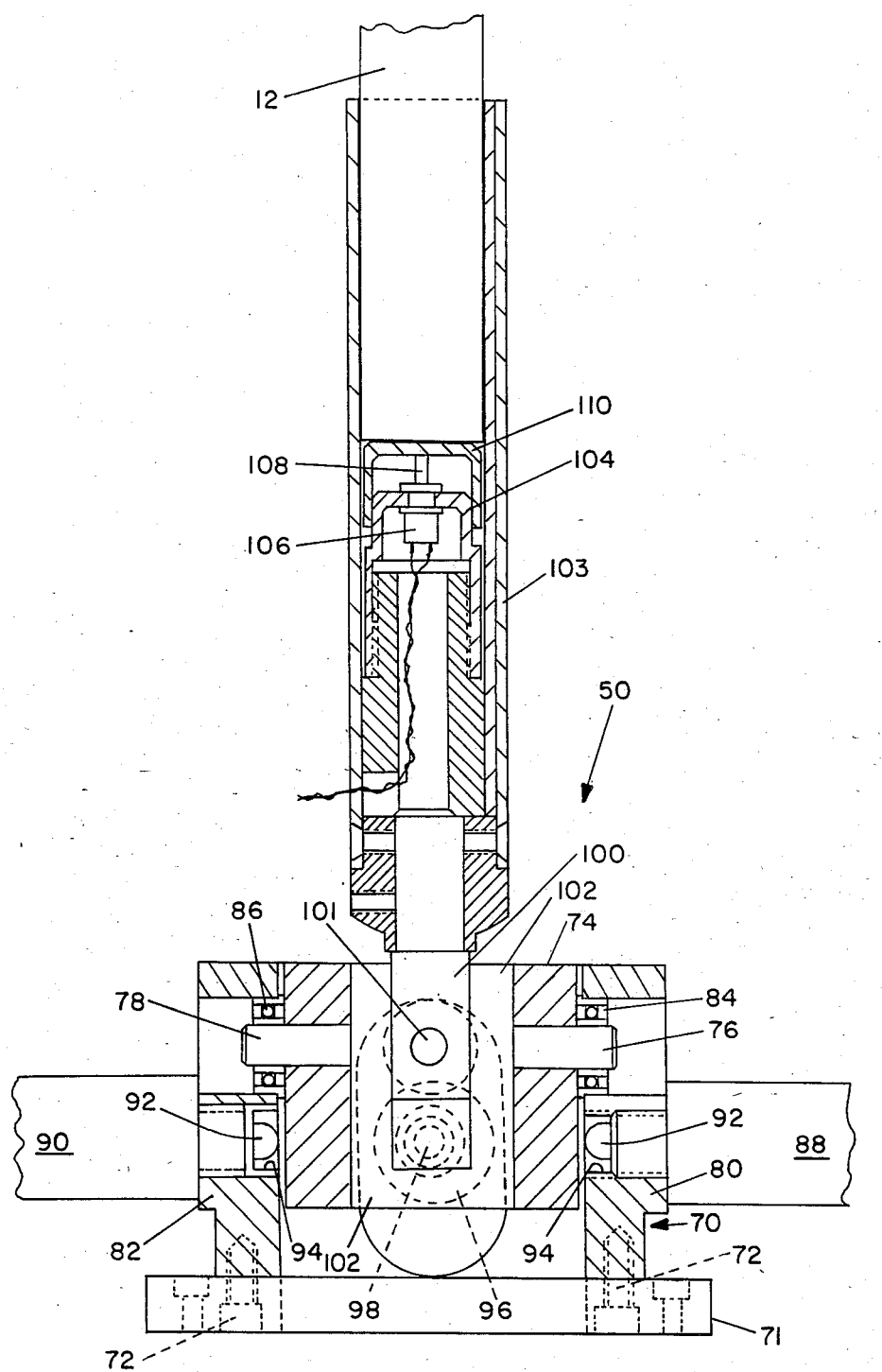
FIG. 2 is a cross-sectional view of the apparatus of FIG. 1 illustrating the details of a gimbal on the apparatus of FIG. 1.

FIG. 2 is a cross-sectional view illustrating the details of the seat 50. The seat 50 includes a housing 70 which is secured to a baseplate 71 by bolts 72. The baseplate 71 is secured to the stage 48 (see FIG. 1). A second housing 74 is located within the housing 70 and is mounted thereto for pivotal movement by way of a pair of oppositely extending pins 76 and 78. Each of the pins 76 and 78 is journaled into a separate one of a pair of opposed walls 80 and 82 of the housing 70 by each of a pair of bearings 84 and 86, respectively.

Each of walls 80 and 82 of the housing 70 mounts a separate one of a pair of opposed, single-acting, spring-return air cylinders 88 and 90. Each of the cylinders 88 and 90 has a shaft 92 which extends horizontally towards the housing 74 through an opening 94 in a separate one of the walls 80 and 82.

The housing 74 mounts a pair of single-acting, spring return air cylinders 96 (only one of which is shown in cross section in FIG. 2) on opposite sides thereof. Each air cylinder 96 has a shaft 98 which extends horizontally therefrom into the housing 74. The shaft 98 of each air cylinder 96 extends towards a support member 100 pivotally mounted within the housing 74 by a pair of pins 101 (only one of which is shown) each journaled into a separate one of the walls 102, (only one of which is shown) of the housing.

Extending upwardly from the support member 100 is a socket 103 which is sized to receive the lower end of the preform 12 therein. A clamping mechanism (not shown) secures the lower end of the preform 12 within the socket 103. An inverted cup-shaped bracket 104 is secured within the socket 103 for mounting a single-pole, single-throw momentary switch 106. The switch 106 has an upwardly extending spring biased plunger 108 which has a head 110 at the upper end thereof for engaging the lower end of the preform 12.

Figure 3:
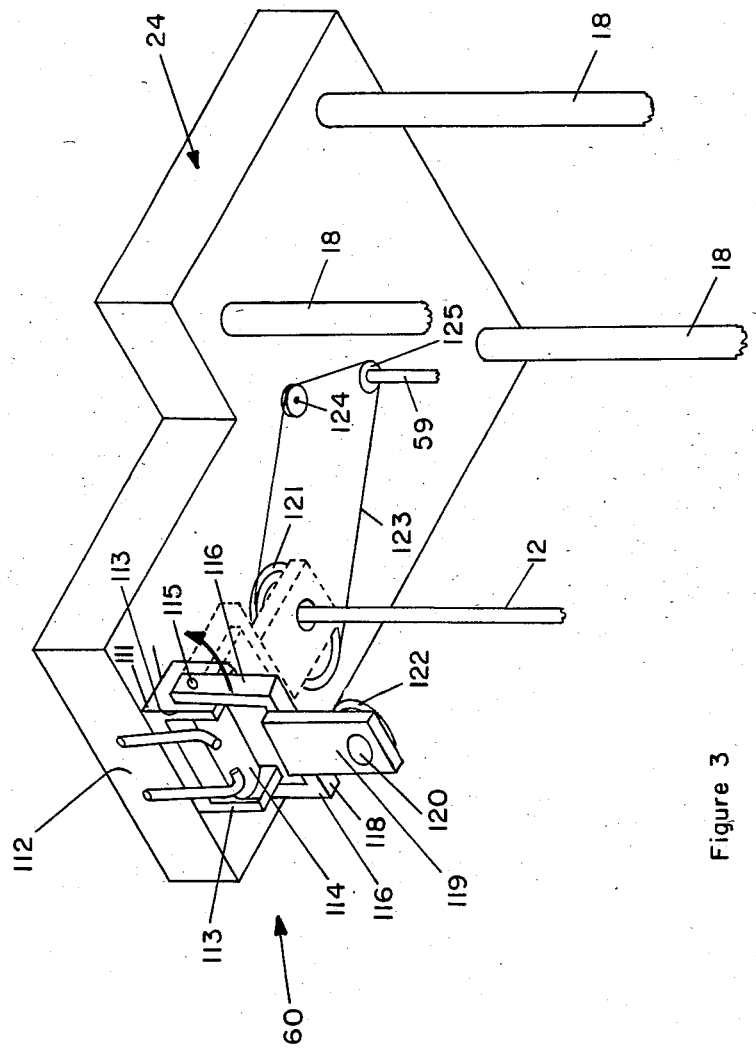
FIG. 3 is a perspective view of a nest on the apparatus of FIG. 1.

FIG. 3 illustrates the details of the nest 60. The nest 60 comprises a U-shaped channel 111 fixedly fastened to the undersurface of the platform 24 adjacent to an edge 112 thereof. The channel 111 has a pair of parallel, spaced-apart, downwardly extending legs 113—113 which engage a rotary air cylinder 114 therebetween. The air cylinder 114 has a pair of oppositely extending shafts 115 (only one of which is shown), each projecting through a separate one of the legs 113—113 of the channel 111. Each shaft 115 of the air cylinder 114 engages a separate one of a pair of legs 116—116 of a yoke 118. A plate 119 is mounted to the yoke 118 so as to extend therebeyond in a direction opposite to the legs 116—116. The plate 119 has a through passage 120 sized to receive the upper end of the preform 12. The exact location of passage 120 in the plate 119 is such that when the plate is positioned parallel to and underneath the platform 24 (as shown in phantom), the passage is coaxial with a hollow cylindrical member 121, which is journaled into the platform coaxial with the chuck 53 (not shown in the figure) for coupling thereto.

A disk 122 is spring biased from the plate 119 so as to face the cylindrical member 121 when the yoke 118 is pivoted to move the plate to a position parallel to and underneath the platform 24. The disk 122 has a tapered aperture (not shown) therethrough in registration with the passage 120 in the plate 119 for seating the upper end of the preform 12 in coaxial registration with the cylindrical member 121.

The cylindrical member 121 has a set of sprocket teeth (not shown) about its periphery for engaging chain 123. The chain 123 also engages an idler sprocket 124 journaled in the platform 24 and a drive sprocket 125 which is carried on that portion of the shaft 59 which extends below the platform. The shaft 59 is driven by the motor 57 of FIG. 1 simultaneously with the chuck 55 of FIG. 1.

Figure 4:
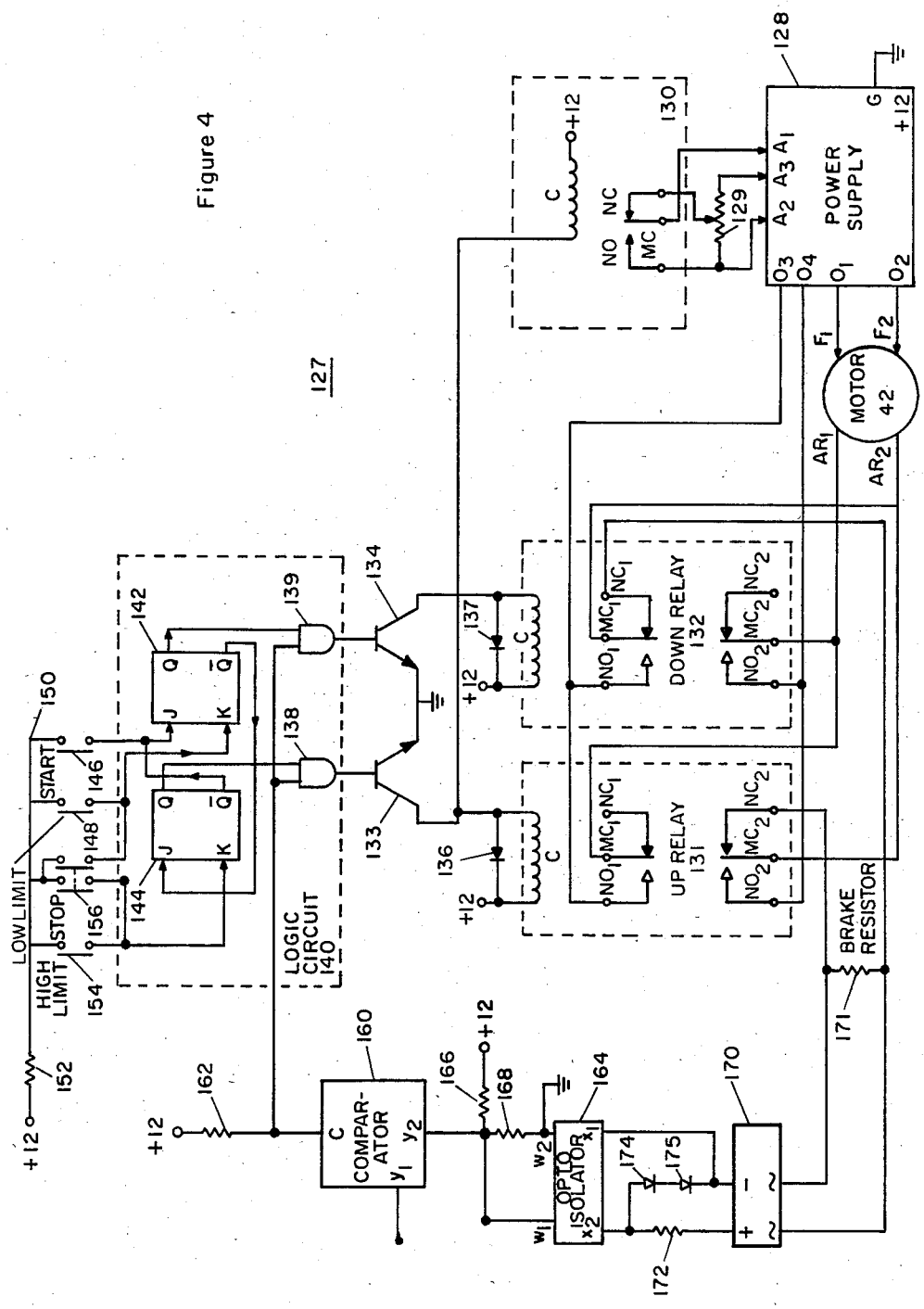
FIG. 4 is a block schematic diagram of a control circuit for controlling the movement of a firepolishing torch on the apparatus of FIG. 1.

FIG. 4 is a schematic block diagram of a control circuit 127 for controlling the motor 42 which propels the platform 26 (FIG. 1). The control circuit 127 includes a power supply 128 which produces a substantially constant DC voltage across a first pair of outputs $O_1$ and $O_2$ which are coupled to each of a set of field terminals $F_1$ and $F_2$, respectively, of the motor 42. A twelve volt DC voltage is produced by the power supply 128 at terminals $+12$ and G, which is connected to circuit ground.

In addition to the two fixed DC voltages, the power supply 128 also produces an adjustable DC voltage across a pair of output terminals $O_3$ and $O_4$, respectively. The magnitude of the adjustable voltage is determined by the ratio of a resistance across a pair of control terminals $A_1$ and $A_2$ of the power supply 128 to a resistance appearing across the control terminal $A_1$ and a control terminal $A_3$. To establish the magnitude of the adjustable voltage, a potentiometer 129 has its fixed resistance portion coupled across the control terminals $A_2$ and $A_3$ of the power supply 128. The potentiometer 129 has its wiper arm connected to a normally closed contact NC of a relay 130 having a coil C. The relay 130 has a movable contact MC and a normally open contact NO each coupled to a separate one of the control terminals $A_1$ and $A_2$, respectively, of the power supply 128.

The motor 42 has a pair of armature terminals $AR_1$ and $AR_2$ which are alternately supplied from the power supply 128 with a positive and negative voltage through one of a pair of double-pole, double-throw relays 131 and 132, respectively. Each of the relays 131 and 132 has a pair of normally open contacts $NO_1$ and $NO_2$, a pair of normally closed contacts $NC_1$ and $NC_2$, a set of movable contacts $MC_1$ and $MC_2$ and a coil C. The contacts $NO_1$ and $NO_2$ of relay 131 are connected to the terminals $O_3$ and $O_4$, respectively, of the power supply 128, whereas the movable contacts $MC_1$ and $MC_2$ of the relay are connected to the armature terminals $AR_1$ and $AR_2$, respectively, of the motor 42.

The contacts $NO_1$ and $NO_2$ of the relay 132 are connected to a separate one of the terminals $O_3$ and $O_4$, respectively, of the power supply 128, whereas movable contacts $MC_1$ and $MC_2$ of that relay are connected to the armature terminals $AR_2$ and $AR_1$, respectively, of the motor 42. The relays 131 and 132 bear the designation "up" and "down" because when each is energized, the motor 42 is supplied at its armature terminals $AR_1$ and $AR_2$ with a positive voltage and negative voltage, respectively, to propel the platform 26 of FIG. 1 upwardly and downwardly, respectively.

The coil C of each of the relays 130, 131 and 132 has one of its two terminals connected to the $+12$ terminal of the power supply 128. The remaining terminal of the coil C of each of relays 130 and 131 is coupled to the collector of a transistor 133. The relay 132 has the remaining terminal of its coil C connected to the collector of a transistor 134. The transistors 133 and 134 each have their respective emitter coupled to circuit ground. Each of a pair of diodes 136 and 137 is coupled across a separate one of the coils C of relays 131 and 132, respectively. Each of the diodes 136 and 137 provides a return path to the $+12$ terminal of the power supply 128 for any current remaining in the coil C of relays 130 and 131 and relay 132, respectively, as each of the transistors 133 and 134, respectively, becomes nonconductive.

Each of transistors 133 and 134 has its base connected to the output of a separate one of a pair of AND gates 138 and 139 which comprise part of a logic circuit 140. The logic circuit 140 also includes a pair of J-K flip flops 142 and 144, each having its respective Q output coupled to one of a pair of inputs of a separate one of the AND gates 139 and 138, respectively. Each of flip flops 142 and 144 has its J input coupled to the Q output of the other flip flop. The K input to each of flip flops 142 and 144 is coupled via a pull down resistor (not shown) to ground to clamp each input.

A first and second momentary, single-pole, single-throw switches 146 and 148 are provided for coupling the J and K inputs, respectively, of the flip flop 142 to a bus 150 which is connected via a dropping resistor 152 to the $+12$ terminal of the power supply 128. A momentary single-pole, single-throw switch 154 couples the bus 150 to the K input of the flip flop 144. Each of the flip flops 142 and 144 has its respective K input coupled to the bus 150 by a momentary double-pole, single-throw switch 156. The switches 148 and 154 bear the designation "low limit" and "high limit", respectively, because each switch is mounted to one of the poles 18 of FIG. 1 (in a manner not shown) so as to be actuated when the platform 26 of FIG. 1 is at the bottom and top of its travel, respectively. The switches 146 and 156 bear the designation "start" and "stop" since the actuation of each switch causes the motor 42 to be started and stopped, respectively, in a manner described hereinafter.

Each of the AND gates 138 and 139 has its second input supplied from a comparator 160 with the signal produced at its output C. A resistor 162 is coupled between the output C of the comparator 160 and the $+12$ terminal of the power supply 128 to maintain the second input to each of the AND gates 138 and 139 at a logic "low" level for so long as the signal at the output C of the comparator remains at a logic "low" level.

The comparator 160 has a first input $Y_1$ coupled to a reference voltage supply (not shown). The second input $Y_2$ of the comparator 160 is coupled to a first input $W_1$ of an opto-isolator 164. The opto-isolator has its second input W₂ connected to circuit ground. A pair of serially coupled resistances 166 and 168 couple the +12 input of the power supply 128 to the second input W₂ of the opto-isolator 164, with the junction between the resistors coupled to the first input W₁ of the opto-isolator.

A full wave rectifier bridge 170 has each of a pair of inputs connected to a separate one of a pair of terminals of a dynamic braking resistor 171 which is coupled between the terminal NC₂ of relay 131 and the terminal NC₁ of relay 132. The rectifier bridge 170 has a negative (−) output terminal coupled directly to a first input X₁ of the opto-isolator 164 and has a positive (+) output terminal coupled to one terminal of a limiting resistor 172. The limiting resistor 172 has its remaining terminal connected to a second input X₂ of the opto-isolator 164. A pair of diodes 174 and 175 is coupled in series aiding fashion between the second input X₂ of the opto-isolator 164 and the negative input (−) of the rectifier bridge 170 to limit the voltage supplied to the opto-isolator.

Figure 5:
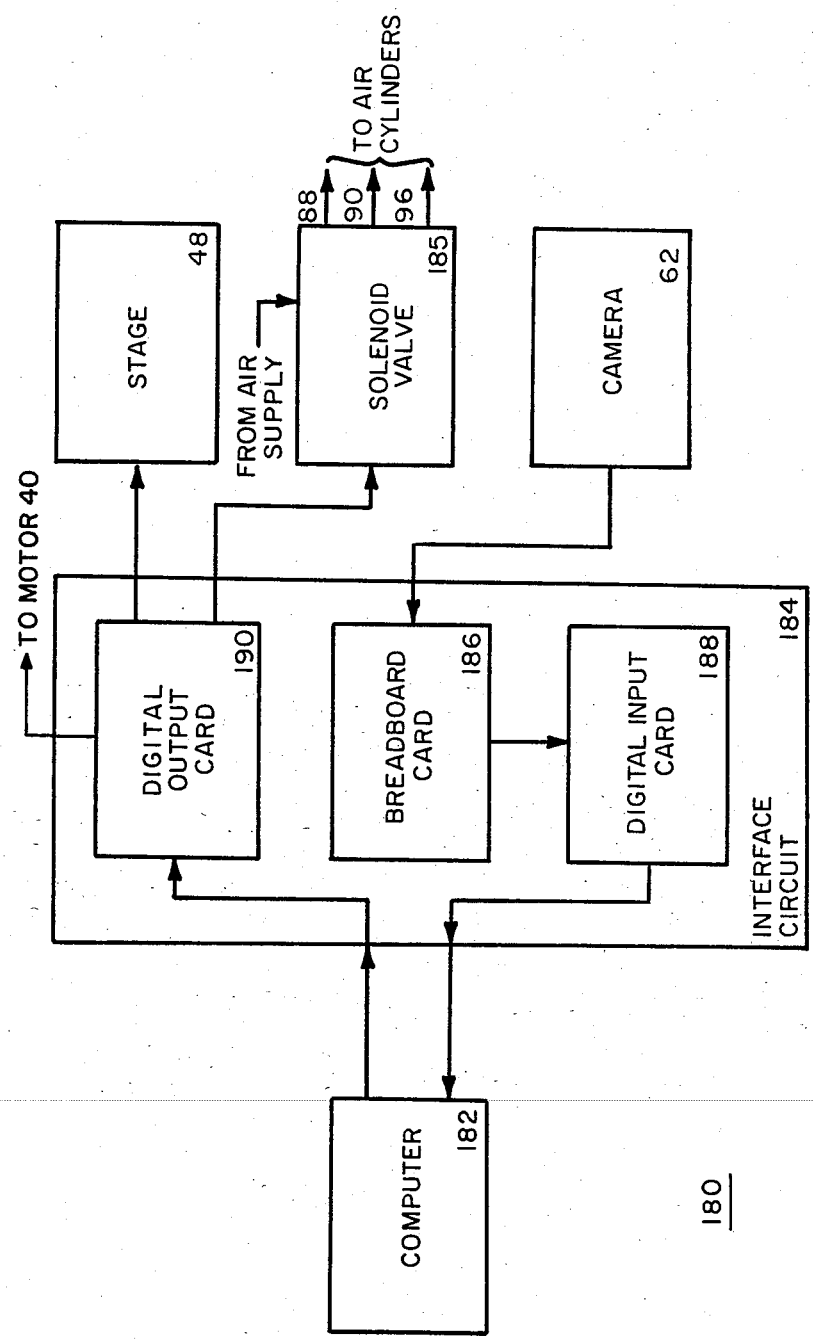
FIG. 5 is a block schematic diagram of a control system mounted for the apparatus of FIG. 1.

FIG. 5 shows a block diagram of a control apparatus 180 which controls the operation of the stage 48 of FIG. 1 and the air cylinders 88, 90 and 96 of FIG. 2 in response to the output signal of the camera 62 of FIG. 1. The control apparatus 180 includes a computer 182 which typically takes the form of a model 85 computer manufactured by Hewlett Packard Company, Palo Alto, CA. The computer 182 is coupled by way of an interface circuit 184 to the stage 48, to the motor 40, to the camera 62 and to a solenoid valve 185 which controls the flow of air from a source of compressed air (not shown) to the air cylinders 88, 90 and 96. The interface circuit 184 typically comprises a model 6940B multiprogrammer manufactured by Hewlett Packard Company and contains a breadboard circuit card 186 and a digital input circuit card 188 for interfacing the camera 62 to the computer 182. The interface circuit 184 also includes a digital output circuit card 190 to couple the output signals of the computer 182 to the stage 48, to the motor 40 and to the solenoid value 185. The circuit cards 186, 188 and 190 are all available from Hewlett Packard Company.

Figure 6:
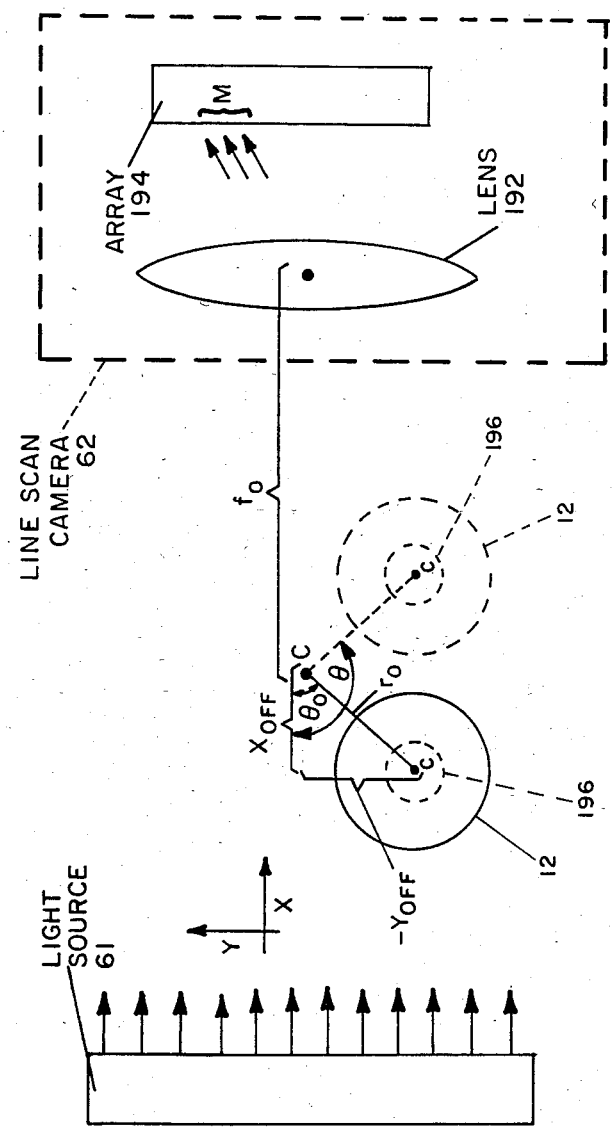
FIG. 6 is a schematic block diagram of a measuring system mounted on the apparatus of FIG. 1 for measuring the amount of radial misalignment between the rod and the tube.

Referring to FIG. 6, there is a block schematic diagram of the camera 62 which will prove helpful in understanding the operation thereof. The camera 62 includes an imaging lens 192 which focuses light received from the light source 61 onto a linear detector array 194. In practice, there are one thousand twenty-four (1,024) individual detector elements (not shown) within the array 194, each element producing an electrical signal in response to light impinging thereon.

The preform 12 will, when positioned between the light source 61 and the lens 192 of the camera 62, only pass light through its central portion 196 (represented in FIG. 6 as a dashed cylindrical outline) towards the lens 192. The light passing through the central portion 196 of the preform 12 is refracted by the lens 192 and strikes those detector elements within the region m on the array 194. Any light entering the preform 12 on either side of the central region 196 is refracted away from the lens 192, and therefore does not strike the array 194, causing those elements closest to the sides of the region m to appear dark.

The light from the light source 61 which passes around the outer edges of the preform 12 is refracted by the lens 192 and strikes those detector elements on the array 194 on either side of those made dark by the light passing through the preform 12 outside of the central region 196 thereof. This may be better understood by reference to FIG. 7 which illustrates the output signal amplitude of each of the individual detector elements of the array 194 in response to the light impinging thereon. The peaks p₁ and p₂ shown in the graph of FIG. 7 correspond to the light passing through the central region 196 (FIG. 6) of the preform 12. The presence of a valley v₁ between the peaks p₁ and p₂ is not fully understood but is believed to be due to the refraction of the light passing directly through the center c of the preform 12 away from the lens 192.

Figure 7:
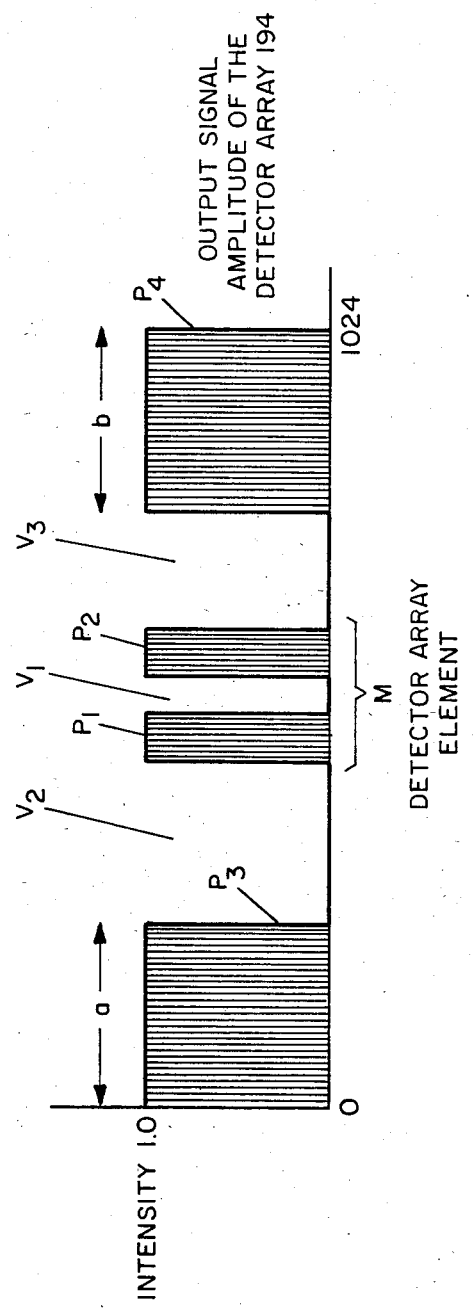
FIG. 7 is a graphical representation of the intensity distribution produced by a detector array of the measuring system of FIG. 6.

On each side of the peaks p₁ and p₂ of the graph of FIG. 7 is a separate one of a pair of valleys v₂ and v₃ which correspond to the detectors of the array 194 of FIG. 6 made dark by light entering the preform 12 on either side of the central region 196 which is refracted away from the lens 192. Outside of the valleys v₂ and v₃ are each of a pair of peaks p₃ and p₄, respectively, which correspond to the light which passes around the outer edges of the preform 12 and into the lens 192. The peaks p₃ and p₄ are of a width a and b, respectively, as measured by the number of individual elements of the array 194 which are illuminated by the light passing around the outer edges of the preform 12.

Referring back to FIG. 6, when the preform 12 is initially seated in the socket 103 of FIG. 2 the center c of the preform is likely to be offset a distance $X_{off}$ and $-Y_{off}$ along the X and Y axes, respectively, from a point C lying along the central axis of the tube 14 (not shown) which is spaced a distance $f_o$ from the center of the lens 192 along the x axis. Such an offset may be due to the preform 12 being misshaped (doglegged).

The amount of offset can, however, be determined from the output signal amplitude of the detector array 194 graphically depicted in FIG. 7. Upon rotation of the rotary table 46 (not shown in FIGS. 6 or 7), the preform 12 of FIG. 6 rotates through angle $\theta$. The position of the preform 12 after rotation is indicated in phantom.

The equation of motion of the center c of preform 12 upon rotation can be mathematically given by a function $f(\theta)$ $$f(\theta) = \frac{1024 + a - b}{2} \quad (1)$$

The function $f(\theta)$ can be expressed in terms of a radial distance $r_o$ from the point C to the center c of the preform 12 c as follows $$f(\theta) = f_o + r_o \cos(\theta_0 + \theta) \quad (2)$$

where ₀ represents the initial offset angle of the preform 12 with respect to X axis. The distances $X_{off}$ and $Y_{off}$ are given by $$X_{off} = r_o \cos(\theta_0) \text{ and} \quad (3)$$

$$Y_{off} = r_o \sin(\theta_0) \quad (4)$$

In practice, the preform 12 is rotated by the rotary table 46 through an arc of 180°. At each 10° interval, the camera 62 of FIG. 6 detects the intensity of the light from the light source 61 which is received through and around the preform and transmits the data to the computer 182 of FIG. 5. In response to the data received from the camera 62, the computer 182 determines values for a and b and then computes the value of the function $f(\theta)$ at each 10° increment in accordance with the equation (1). From the computed values of $f(\theta)$, the computer 182 then performs a least square fit to determine $f_0$, $r_0$ and $\theta_0$ in accordance with equation (2).

Once a complete 180° rotation of the table 46 of FIG. 1 has been accomplished and the intensity of the light passing through and around the preform 12 has been measured at each 10° interval, the platform 22 of FIG. 1 is driven upwardly a short distance, typically 5 cm by appropriately energizing motor 32 of FIG. 1. The steps of: (a) rotating preform 12 through an arc of 180°, (b) measuring the intensity of the light passing through and around the preform, (c) calculating the value of $f(\theta)$ at each 10° interval and (d) computing values for $f_o$, $r_o$ and $\theta_o$ are repeated. Upon completion of these steps, platform 22 is again driven upwardly and the steps are again repeated until the entire length of the preform has been traversed by the camera 62.

Once the computer 182 of FIG. 5 has determined values for $f_o$, $r_o$ and $\theta_o$ at each 5 cm increment, then this data is fit to a model of a standard preform (not shown) to determine the necessary movement of the stage 48 in the X and Y directions to compensate for any radial misalignment between the tube 14 and the preform 12. In practice, the model of the standard preform is typically obtained by measuring the intensity of light passing through and around the edges of a straight preform, that is one having no curvature or diameter variation. Using a straight preform as the model is advantageous as it allows the computer 182 to perform a linear least square fit of the radial offset distance $r_0$ versus the height of the preform 12 to obtain the necessary X and Y offset corrections.

In practice, the internal diameter of the tube 14 is entered into the memory location in the computer 182 at the outset of operation of the apparatus 10. From a knowledge of the internal diameter of the tube 14 and from a knowledge of the location of each of a pair of opposed edges of the preform 12 (as determined by the values of a and b), the computer 182, using the model of the standard preform to determine the offset distances, can determine if the preform can in fact be inserted into the tube without contacting the walls thereof. Such a determination is accomplished by comparing the offset distance between each of the edges of the preform to center C of the tube 14 to one half of the internal diameter of the tube.

Determining the actuation of the stage 48 by fitting the measured values of $r_o$, $\theta_o$ and $f_o$ to a model of a straight preform compensates for any variations in the shape of the actual preform 12. However, if the preform 12 is substantially straight, then a much simpler procedure can be used. If the preform 12 is substantially straight, then the tip of the preform can be assumed to be in alignment with the axis of the tube 14. Only one measurement of the radial offset of the preform 12 from the axis tube 14 need be made. The stage 48 is then actuated to move the preform 12 in accordance with the single measured offset distance.

Figure 8:
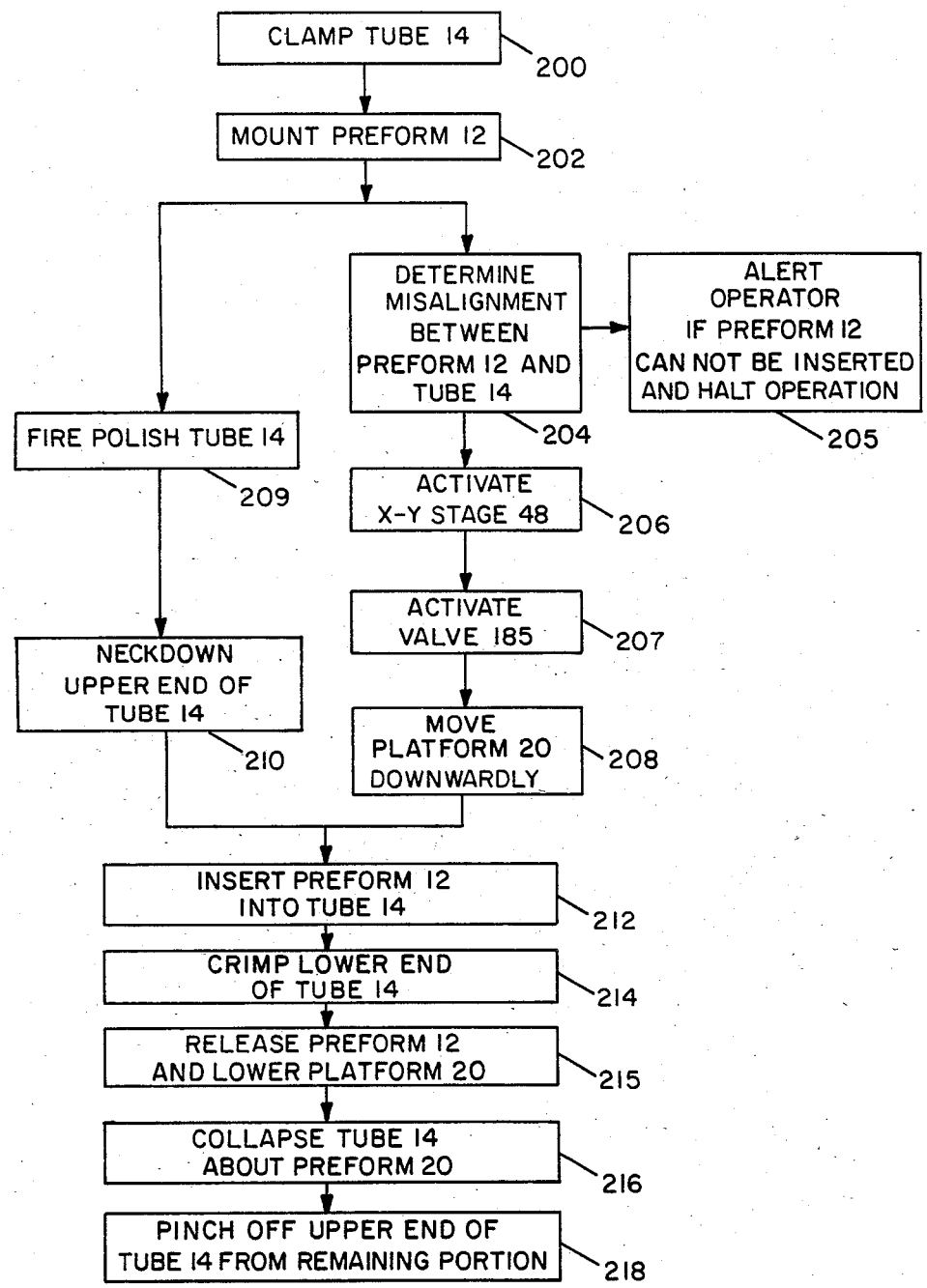
FIG. 8 is a block diagram depicting a method of inserting a glass rod into a tube practiced by the apparatus of FIG. 1.

The overall operation of the apparatus 10 of FIG. 1 may best be understood by reference to FIG. 8 which illustrates, in sequence, each step of a method for inserting the preform 12 into the tube 14. Initially, the tube 14 is clamped (step 200) by inserting the tube through the opening 54 and securing one end in the chuck 55. The other end of the tube is then secured in the chuck 53. Depending on the length of the tube 14, it may be necessary to move the platform 24 by engaging the motor 41 of FIG. 1 to accommodate the tube.

The preform 12 is then mounted (step 202) in the following manner. The cylinder 114 (FIG. 3) is actuated to pivot the plate 119 (FIG. 3) parallel to the platform 24 (FIG. 1). The preform 12 is received through the opening 52 (FIG. 1) in the platform 22 (FIG. 1) and the upper end thereof is inserted into the opening 120 (FIG. 3) in the plate 119 against the spring-biased disk 122 (FIG. 3). As the upper end of the preform 12 is held against the disc 122, the lower end thereof is seated into the socket 103 (FIG. 2) and is then clamped.

Once the preform 12 has been mounted, the radial misalignment, if any, between the preform and the tube 14 is determined (step 204) in the manner described previously with respect to FIG. 7. If the measured amount of misalignment is too great to permit insertion of the preform 12 without contacting the inside surface of the tube 14, then the operator is alerted (step 205) and operation of the apparatus 10 ceases. Otherwise, the X-Y stage 48 is then actuated in accordance with the amount of radial offset determined by computer 182 to achieve precise alignment of the preform 12 with the tube 14 (step 206).

Thereafter, the solenoid valve 185 of FIG. 5 is actuated, causing the air cylinders 88, 90 and 96 of FIG. 2 to clamp the support member 100 and the housing 74 of FIG. 2 to prevent movement thereof (step 207). By clamping the support member 100 and the housing 74, the alignment of the preform 12 with the tube 14 is maintained substantially fixed. Thereafter, the platform 20 of FIG. 1 is driven downwardly by energizing motor 38 of FIG. 1 (step 208) so that the plate 119 can be pivoted away from the end of the preform 12 upon actuation of the air cylinder 114 of FIG. 3.

As the steps 204, 206, 207 and 208 are being executed, the tube 14 is firepolished (step 209). Firepolishing is accomplished by energizing the motor 57 to rotate the tube 14 and reciprocating the platform 26 between platforms 24 and 19 to move the torch 64 along the tube. Referring back to FIG. 4, reciprocation of the platform 26 is initiated by closing the start switch 146 which sets the flip flop 142, thereby causing a logic "high" level signal to appear at the Q output thereof.

If the motor 42 is at rest, then a null level voltage appears across the braking resistor 171, causing a null level voltage to appear across to inputs $Y_1$ and $Y_2$ of the comparator 162. As the result of such a condition, the comparator 162 produces a logic "high" level voltage at its output, which causes the AND gate 139 to be enabled and render transistor 134 conductive, which in turn, energizes the relay 132. Once relay 132 is energized, the motor 42 is supplied with a positive voltage across its armature terminals $AR_1$ and $AR_2$ and in response, drives the platform 26 of FIG. 1 downwardly.

The motor 42 continues to drive the platform 26 (FIG. 1) downwardly to its lowermost position of travel whereupon the low limit switch 148 is actuated to reset the flip flop 142. When reset, the flip flop 142 drives the output of the AND gate 139 to a logic "low" level voltage thereby rendering transistor 134 nonconductive. The relay 132 now becomes deenergized and interrupts the supply of armature current to the motor 42, causing downward travel of the platform 26 to come to a halt.

The resetting of the flip flop 142 causes flip flop 144 to be set. However, even though flip flop 144 is now set, the AND gate 138 remains disabled because the motor 42 does not decelerate to zero immediately after the relay 132 is deenergized. As the motor 42 slows to a stop, the back EMF thereof dissipates into the resistor 171 to achieve regenerative breaking of the motor. While a voltage is present across resistor 171, the full wave rectifier bridge 170 produces a DC voltage which appears across the inputs $X_1$ and $X_2$ of the opto-isolator 164. The presence of a voltage across the inputs $X_1$ and $X_2$ of the opto-isolator 164 causes a short circuit to appear across its output terminals $W_1$ and $W_2$. With a short circuit present across the outputs $W_1$ and $W_2$ of the opto-isolator 164, a voltage difference appears across the inputs $Y_1$ and $Y_2$ of the comparator 160, causing the signal at the output C of the comparator to remain at a logic "low" level, thus disabling the AND gate 138.

Only after motor 42 has reached nearly a dead stop does the voltage difference across the inputs $X_1$ and $X_2$ of the opto-isolator 164 become negligible, causing the comparator to enable the AND gate 138, thereby rendering transistor 133 conductive. Once transistor 133 becomes conductive, relay 131 is energized, causing motor 42 to be supplied with a negative armature voltage. In response to the negative armature voltage, the motor 42 drives the platform 26 upwardly.

The conduction of transistor 133 also causes the relay 130 to become energized, thereby placing a short circuit between the control terminals $A_1$ and $A_2$ of the power supply 128. In response to the short circuit between the control terminals $A_1$ and $A_2$, the magnitude of the negative voltage supplied across the armature terminals $Ar_1$ and $Ar_2$ of motor 42 increases significantly as compared to the magnitude of the armature voltage supplied while the relay 130 remains deenergized. As a result, speed at which platform 26 is driven upwardly is greater than the speed of its downward movement.

Once the platform 26 reaches its upwardmost limit of travel, the high limit switch 154 becomes actuated, thereby resetting the flip flop 144, which causes flip flop 142 to be set. However, even though flip flop 142 now is set, the AND gate 139 remains disabled until the motor 42 reaches nearly a dead stop. Once the motor 42 has decelerated almost to rest, the comparator 160 then enables the AND gate 139, causing transistor 134 to become conductive. With the transistor 134 now conductive, the relay 132 is energized thereby to supply the motor 42 with a positive armature voltage, causing the motor to drive platform 26 downwardly. However, the speed of downward travel of the platform 26 is less than the speed of the previous upward movement of the platform because the relay 130 becomes deenergized once transistor 134 is nonconductive, thereby causing a finite resistance to appear across the terminals $A_1$ and $A_2$ of the power supply 128. This causes the magnitude of the voltage appearing across the terminals $O_3$ and $O_4$ of the power supply 128 to decrease.

Reciprocation of the platform 26 continues in the manner described above until the stop switch 156 is actuated. Upon actuation of the switch 156, both of the flip flops 142 and 144 become reset so that both of the transistors 133 and 134 become nonconductive deenergizing both of the relays 131 and 132 so that the motor 42 is starved of armature current.

Referring back to FIG. 8, once the tube 14 of FIG. 2 has been firepolished, the upper end of the tube is crimped upon heating by the torch 64 (step 210). Following both steps 208 and 210, the motor 38 of FIG. 1 is energized to drive the platform 20 of FIG. 1 upwardly (step 212) to insert the preform 12 into the tube 14. Once the end of the preform 12 abuts the necked-down end of the tube 14, continued upward movement of the platform 20 causes the plunger 108 (FIG. 2) of switch 106 (FIG. 1) to be depressed thereby actuating the switch. The actuation of the switch 106 signals the completion of the insertion of the preform 12 into the tube 14 so that motor 38 is then deenergized, causing upward movement of the platform 20 to cease.

Once the preform 12 has been inserted into the rod 14, the lower end of the tube 14 is staked (step 214) to capture substantially all of the preform in the tube. Next, the end of the preform 12 which had been tightly clamped in the socket 103, is now released, and the platform 20 is lowered to allow the end of the preform to clear the socket (step 215). Once the preform 12 is released and the platform 20 is lowered, tube 14 is rotated while being heated by the torch 64 (now adjusted to produce a wide heat zone) to collapse the tube about the preform (step 216). Finally, the platform 26 is driven upwardly to return the torch 64 to the necked-down upper end of the tube 14. The necked-down upper end of the tube 14 is then heated to achieve complete pinch-off and separation of the remaining portion of the collapsed tube which has the preform 12 therein (step 218). The portion of the collapsed tube 14, having the preform 12 therein, yields a preform having the desired core-to-cladding mass ratio.

It is to be understood that the various embodiments described herein are merely illustrative of the principles of the invention. Various modifications may be made thereto by persons skilled in the art which may embody the principles of the invention and fall within the spirit and scope thereof.

What is claimed is:

1. A method for inserting a glass rod into a glass tube comprising the steps of:
    roughly aligning the rod axially with the tube;
    measuring the offset of the rod from the axis of the tube to determine the amount of lateral movement of the rod from the axis of the tube required to achieve precise spaced alignment with the tube;
    laterally moving the rod in accordance with the determined amount of movement;
    inserting the rod into the tube; and
    capturing the rod within the tube following insertion.

2. The invention according to claim 1 including the step of firepolishing the tube prior to insertion of the rod therein.

3. The invention according to claim 1 wherein the step of capturing the rod within in the tube comprises the steps of:
    (a) crimping one of the ends of the tube prior to insertion of the rod therein; and
    (b) crimping the opposite end of the tube after insertion of the rod therein.

4. The method according to claim 3 further includes the step of collapsing the tube about the rod.

5. The method according to claim 1 further including the steps of:
    (a) measuring the distance between each of a pair of opposed outer edges of the rod and the central axis of the tube at each of a plurality of locations along the length of the rod; and
    (b) comparing the measured distance of each opposed outer edge of the rod to one half of the internal diameter of the tube to ascertain whether the rod can be inserted into the tube without contacting the inside surfaces thereof and if not, providing an indication that insertion cannot be accomplished.

6. A method for inserting a lightguide preform into a glass tube comprising the steps of:

roughly aligning the preform in coaxial registration with the tube;

necking down one end of the tube;

measuring the amount of radial offset between the preform and the axis of the tube at each of a plurality of locations along the length of the tube and fitting the measured offset to a model of an acceptable rod to determine the amount of lateral movement of the preform from the axis required to achieve precise spaced alignment thereof with the tube;

moving the preform in accordance with the determined amount of movement;

inserting the preform into the tube until an end thereof seats against the necked-down end of the tube;

crimping the end of the tube opposite the necked-down end thereof to capture the preform therein; and collapsing the tube about the preform.

7. The method according to claim 6 further including the steps of:

(a) measuring the distance between each of a pair of opposed outer edges of the rod and the central axis of the tube at each of a plurality of locations along the length of the rod; and (b) comparing the measured distance of each of the opposed edges of the rod to one half of the internal diameter of the tube to ascertain whether the rod can be inserted into the tube without contacting the inside surfaces thereof and if not, providing an indication that insertion cannot be accomplished.

8. The invention according to claim 6 wherein the radial offset between the preform and the axis of the tube is measured by the method comprising the steps of:

(a) illuminating the preform so that light passes around and directly through the preform;

(b) rotating the preform about its axis through an arc of 180°;

(c) detecting the light passing around and through the preform at each of a plurality of 10° intervals to determine the location of each of a pair of opposed outer edges of the preform;

(d) repeating the steps of (b) rotating the preform and (c) detecting the light passing through and around the preform, at each of a plurality of spaced-apart intervals along the length of the preform; and (e) fitting the data indicative of the location of each of the edges of the preform to a model of a straight preform to determine the radial offset between the preform and the tube.

9. Apparatus for inserting a glass rod into a glass tube comprising:

means for roughly aligning a glass rod in coaxial alignment with a glass tube;

means carried by said aigning means for measuring the offset of the rod from the axis of the tube to determine the amount of lateral movement of the rod from the axis of the tube required to achieve precise spaced alignment with the tube;

means responsive to said measuring means for laterally moving said aligning means to displace the rod in accordance with the determined amount of movement;

means for vertically moving said aligning means to insert the rod into the tube; and means carried by said aligning means for capturing the rod within the tube following insertion thereof.

10. The invention according to claim 9 wherein said aligning means comprises:

a base;

plurality of parallel, spaced-apart poles extending upwardly from said base;

a first platform fastened to each of said poles in parallel, spaced-apart relationship above said base for engaging one end of said tube;

a second platform slidably mounted to said poles in parallel, spaced relationship below said first platform for mounting the other end of the tube;

a third platform slidably mounted to said poles in parallel, spaced relationship below said second platform;

a seat supported from third platform for receiving one end of the rod; and nest means pivotally mounted to said second platform for rotation between a first position parallel to and underneath said platform at which said nest means engages and maintains another end of the rod in substantial alignment with the tube and, a second position at which said nest is perpendicular to said second platform and is distal from the other end of said rod.

11. The invention according to claim 10 wherein said means for measuring the offset of the rod from the axis of the tube comprises:

a fourth platform slidably mounted on said poles intermediate between said second and third platforms;

an illumination source carried by said fourth platform for directing light into and around the rod;

means on said third platform for rotating the rod during the illumination thereof;

a detector carried by said fourth platform so as to be in registration with said illumination source for sensing the light which passes through, and around the rod during the rotation thereof; and processor means coupled to said detector for determining the offset of the rod from the axis of the tube in accordance with the light detected by said detector as the rod is rotated.

12. The invention according to claim 11 wherein said means for laterally moving said aligning means includes:

an X-Y stage mounted between said seat and said rotating means for moving said seat in accordance with the amount of offset determined by said processor means.

13. The invention according to claim 10 wherein said means for capturing said rod in said tube comprises:

a fifth platform slidably mounted on said poles intermediate said first and second platforms;

a torch carried by said platform for heating said tube to crimp the tube adjacent to the ends thereof and to collapse the tube about the preform; and means for reciprocating said fifth platform between said first and second platforms to displace said torch along said tube.

14. Apparatus for inserting a lightguide preform into a tube comprising:

a base;

a plurality of parallel, spaced-apart poles extending upwardly from said base;

a first platform mounted to said poles in parallel, spaced-apart relationship above the base for engaging one end of a tube;

a second platform slidably mounted to said poles in parallel, spaced-apart relationship below said first platform for engaging the other end of said tube;

a third platform slidably mounted by said poles in parallel, spaced-apart registration below said second platform;

gimbal means mounted on said third platform for engaging and moving one end of a preform radially relative to said tube;

nest means pivotally mounted to the second platform for rotation between a first position parallel to and underneath the second platform for receiving and guiding the other end of the preform into alignment with the tube, and a second position at which said nest means is distal from the other end of the preform;

a fourth platform slidably mounted on said poles in parallel, spaced-apart relationship between said second and third platforms;

measuring means carried in part by said fourth platform for measuring the offset of the preform from the axis of the tube;

processor means programmed with the internal diameter of said tube and responsive to the amount of offset measured by said measuring means for indicating when the offset of said rod is too great to permit insertion into the tube and for actuating the gimbal means in accordance with the amount of the measured offset to precisely align the rod with the tube when the measured offset is small enough to enable rod insertion;

means for driving said second platform upwardly to insert the preform into the tube;

a fifth platform movably mounted to said frame intermediate said first and second platforms;

a torch carried by said fifth platform for heating said tube to crimp the ends thereof and for collapsing said tube upon insertion of the preform therein; and means for reciprocating said fifth platform along said frame.

15. The invention according to claim 14 wherein said measuring means comprises:

a light source mounted on said fourth platform for illuminating the preform so that light passes through and around the preform;

means on said third platform for rotating the preform during the illumination thereof; and a line scan camera mounted on said fourth platform and positioned opposite said light source for detecting the light passing through and around the preform.

16. The invention according to claim 14 wherein said reciprocating means comprises:

a DC motor coupled to said fifth platform for propelling said platform along the poles; and a control circuit for alternately supplying said motor with voltage of a positive and negative polarity to cause said motor to propel said fifth platform alternately upwardly and downwardly along said poles.

* * * * *